United States Patent [19]

Manico et al.

[11] Patent Number: 5,231,506
[45] Date of Patent: Jul. 27, 1993

[54] GENERATION OF HARD COPY COLOR PHOTO REPRODUCTIONS FROM DIGITALLY CREATED INTERNEGATIVE

[75] Inventors: Joseph A. Manico, Rochester; Stephen H. Kristy, Fairport, both of N.Y.

[73] Assignee: Eastman Kodak Company, Rochester, N.Y.

[21] Appl. No.: 631,708

[22] Filed: Dec. 21, 1990

[51] Int. Cl.⁵ .................. H04N 1/23; H04N 1/46
[52] U.S. Cl. ................................ 358/302; 358/75
[58] Field of Search ............. 358/296, 302, 76, 80, 358/75; 355/38, 77, 68, 32

[56] References Cited

U.S. PATENT DOCUMENTS

| | | |
|---|---|---|
| 3,730,624 | 5/1973 | Silver . |
| 3,756,718 | 9/1973 | Letzer ............................ 355/88 |
| 4,340,905 | 7/1982 | Balding .......................... 358/80 |
| 4,358,828 | 5/1983 | Prentice . |
| 4,368,484 | 1/1983 | Stemme et al. ................ 358/41 |
| 4,430,668 | 2/1984 | Miles, Jr. ....................... 358/75 |
| 4,630,921 | 12/1986 | Watanabe . |
| 4,656,524 | 4/1987 | Norris et al. . |
| 4,656,525 | 4/1987 | Norris . |
| 4,729,015 | 3/1988 | Wagensommer ............. 358/76 |
| 4,786,917 | 11/1988 | Hauschild ..................... 346/76 |
| 4,804,977 | 2/1989 | Long .............................. 346/76 |
| 4,816,902 | 3/1989 | Yamanishi ..................... 358/75 |

*Primary Examiner*—Benjamin R. Fuller
*Assistant Examiner*—Scott A. Rogers
*Attorney, Agent, or Firm*—Edward Dugas

[57] ABSTRACT

A hybrid multiple color print reproduction scheme for a digital color image photo-finishing system employing a digitally driven high spatial resolution color printer converts a stored digital positive (e.g. RGB-representative) color image into a second digital color (e.g. CYM-representative) image. This second digital image effectively corresponds to a mirror-reversed complement of the positive color image and is digitally adjusted such that its tone and color characteristics optimize reproduction of the positive image via a conventional chemical development process. The complement color image is output to a digital printer which prints an 'internegative' image onto a transparency medium, rather than the customary print paper. This digitally produced 'internegative' is used to replicate multiple copies of the original image using a conventional analog electro-optic system and an associated chemical-based print developing unit, thereby providing a substantial savings in reproduction time and costs.

26 Claims, 2 Drawing Sheets

GENERATION OF HARD COPY COLOR PHOTO REPRODUCTIONS FROM DIGITALLY CREATED INTERNEGATIVE

FIELD OF THE INVENTION

The present invention relates in general to color photo-reproduction systems and is particularly directed to a system for making hard copy reproductions of digitally stored and processed images.

BACKGROUND OF THE INVENTION

Recent improvements in their spatial and data resolution capabilities have made digital color image processing systems particularly attractive for a variety of photo-processing (e.g. photo-finishing) applications. In still color image photography, for example, once an image (such as that captured on color photographic film or a high resolution color digital camera) has been digitized and stored in an attendant data base, it is readily optimized for reproduction by means of photo-finishing image processing software. One example of a color photo-finishing system that takes advantage of this capability is disclosed in co-pending patent application Ser. No. 582,305, filed Sep. 14, 1990, by S. Kristy entitled "Multiresolution Digital Imagery Photofinishing System," assigned to the assignee of the present application and the disclosure of which is herein incorporated.

As described in that application, conventional photofinishing of consumer-generated still color photographs (e.g. those captured on 35 mm color film) involves the use of an analog electro-optic system and an associated chemical-based print developing unit. In the above-referenced Kristy application, there is described a digital image-based photofinishing apparatus that enables the user (which may be an unskilled consumer) to personally customize and obtain high quality prints of photographic images; it also provides for the storage and retrieval of high resolution digitized color still images for playback to a variety of reproduction devices.

To this end, as diagrammatically illustrated in FIG. 1, the improved photofinishing apparatus employs a high resolution opto-electronic film scanner 12, the output of which is coupled to a host digitized image processor (host computer) 14. Scanner 12 may comprise a commercially available Eikonix Model 1435 high resolution scanner, having a very high resolution sensor pixel array (a 3072×2048 pixel matrix) capable of generating high spatial density-representative output signals which, when converted into digital format, yield 'digitized' photographic image files from which high quality color prints may be obtained. Scanner 12 is arranged to be optically coupled with a photographic recording medium, such as a consumer-supplied 35 mm color film strip 16. Film strip 16 typically contains a plurality (e.g. a set of twenty-four or thirty-six) 36 mm×24 mm color image frames. For each scanned image frame, scanner 12 outputs digitally encoded data, representative of the opto-electronic response of its high resolution imaging sensor pixel array, onto which a respective photographic image frame of film strip 16 is projected by the scanner's input lens system.

This digitally encoded data, or 'digitized' image, is supplied in the form of an imaging pixel array-representative bit map, resolved to a prescribed code width (e.g. eight bits per color per pixel), to host processor 14. Host processor 14 contains an image encoding and storage operator through which each high resolution digitized image file is stored in a multiresolution, hierarchical format. The use of a multiresolution storage format facilitates retrieval of images for reproduction by a variety of devices the resolution of which may vary from device to device, such as a low/moderate NTSC television monitor or a very high resolution, digitally driven, color thermal printer.

One example of a preferred encoding and storage operator that may be used for this purpose is described in U.S. Pat. No. 4,969,204, entitled "A Hybrid Residual-Based Hierarchical Storage and Display Method for High Resolution Digital Images in a Multiuse Environment," by Paul W. Melnychuck et al, assigned to the assignee of the present application and the disclosure of which is herein incorporated.

As described in that application, an original 2048×3072 (2K×3K) high resolution image may be sequentially 'down-converted' into a hierarchical set of respectively different resolution residue images and a base resolution image file. The base file may comprise a 512×768 pixel array file formatted as a set of four interlaced (256 lines by 384 pixels/line) lowest resolution image sub-arrays, respectively corresponding to odd pixel/odd line, odd pixel/even line, even pixel/odd line, even pixel/even line sub-arrays. One of the lowest resolution image 256×384 sub-arrays is suitable for preliminary display on an NTSC-quality video monitor, while the full 512×768 base resolution array provides a high quality image on a an NTSC video monitor. An individual lowest resolution 256×384 sub-array may be further sub-sampled to obtain one or more lower resolution files (e.g. a 128×192 pixel sub-array) for supporting the display of one or more relatively smaller images, as will be explained below. The spatial parameters of each of the hierarchical image files into which an original 2K×3K file is encoded and stored are chosen to facilitate the implementation and incorporation of a low cost, reduced complexity frame store/data retrieval architecture into a variety of reproduction devices, thereby providing for rapid call-up and output (display or print out) of one or more selected images.

For this purpose, host computer 14 may be interfaced with one or more interactive video display terminals (VDTs) or workstations 18 through which digitized image files may be controllably called up for display to a user, in the course of customizing the image prior to further storage or print out. Host computer 14 may also be coupled to drive an optical compact disc recorder 19, or a high resolution output reproduction device, such as digitally driven color thermal printer 20. In a commercial photofinishing application, thermal printer 20 may be used to output a hard copy color print of the digitized image for a customer who has delivered one or more rolls of 35 mm film to the photofinisher for processing.

Where the customer supplies a previously prepared optical disc, the disc is inserted in a disc reader 21, which may be coupled to the host computer 14 or VDT 18. In this application, the control mechanism that drives the video display terminal may contain a simplified or edited version of bit map manipulation software, such as that supplied by a computer graphics vendor, which provides the photofinishing operator with the ability to access menu-driven image manipulation functions, such as the addition of text to the image, zoom, crop, and tone and color corrections of a low resolution (128×192) image of a selected file. Once the user is satisfied with what is displayed on the screen, its corresponding highest resolution image (2K×3K) image is processed using workstation-entered selections to drive an associated high resolution digital color printer 20, which produces a high quality hard copy print of the processed digital image.

Non-limitative examples of readily coded image processing algorithms that may be used for this purpose include those described in the published literature, such as "Digital Image Processing" by William K. Pratt, in particular, Chapters 4, 12 and 16, respectively entitled "Image Sampling and Reconstruction," "Image Enhancement" and "Luminance, Color, and Spectral Image Restoration," 1978 John Wiley and Sons, ISBN 0-471-01888-0; and "Digital Image Processing" by Rafel C. Gonzalez, in particular, Chapter 4, entitled "Image Enhancement," 1983 Addison-Wesley Publishing Company, Inc. ISBN 0-201-02596-5. Many of such image processing algorithms have been implemented as commercially available packages (which perform all functions on the highest resolution data, so that, without the hierarchical scheme employed in the above-referenced Melynchuck application, they are slower). Their encoding schemes are optimized for performance and are commercially available as libraries of subroutines, such as MathPAK 87 (a trademark of Precision Plus Software). Additional image processing software that may be used includes Photoshop (trademark of Adobe Systems Incorporated), ColorStudio (trademark of Letraset) and PhotoMac (trademark of Avalon Development Group).

Now although a high spatial resolution digital output device, such as a digital thermal color printer, is able to provide a high quality hard copy of a customized image directly from the digital data base, it is relatively slow. Also, because the output reproduction medium (e.g. thermal color print paper) upon which the image is written, is not inexpensive, the price per print remains substantially high, regardless of the number of copies made.

In a conventional analog optical/chemical photo-finishing process, on the other hand, multiple copies of an original image can be made through repeated illumination of a negative onto sheets of relatively inexpensive photo-sensitive color print paper, such as Ektacolor (Trademark Eastman Kodak Co.) color print paper and chemically developing the exposed sheets during a reasonably abbreviated processing sequence. Unfortunately, purely optical/chemical processing systems do not offer the flexibility and processing capability of digital image processing systems.

SUMMARY OF THE INVENTION

In accordance with the present invention, there is provided a hybrid photo-finishing system which integrates the low cost and reduced processing time for multiple copy replication by an analog optic/chemical system with the digital enhancement flexibility of a digital image processing system, thereby making it possible to substantially reduce the time of production and cost of printing large quantities (e.g. twenty to fifty or more) hard copy prints of images that have been optimized in a digital processing scheme.

More particularly, the present invention is directed to multiple print reproduction scheme that is provided as an adjunct to a digital color image processing system. The digital color image processing system has a digital image data base in which digitized imagery data (e.g. red, green, blue (RGB)-representative data) for a captured positive color image is stored. The stored data may be manipulated by a photofinishing workstation operator to customize the image and then output to a digitally driven, high spatial resolution reproduction device, such as a digitally driven thermal color printer, which is customarily used to print a positive color image directly onto a relatively high cost color print medium, such as thermal color print paper.

In accordance with a first embodiment of the invention, where the output print medium constitutes a positive image print medium, such as the above-mentioned Ektacolor color print paper, the hybrid system performs a mirror-image reversal of the stored digital positive color image and converts its color metric into a second digital color (e.g. cyan, yellow, magenta (CYM)-representative) image, which effectively corresponds to a complement of the positive color image. This mirror-reversed, complement image is digitally adjusted by way of photofinishing software resident in the photo-finishing workstation, such that prescribed characteristics (e.g. tone and color) are optimized for reproduction of the positive image via a positive color print reproduction medium that may be used by a conventional chemical development process (e.g. Ektacolor print paper).

The mirror-reversed complement color image is output to a high spatial resolution digital output device, such as a high resolution photostatic color printer or a high resolution digitally driven thermal color printer, which prints the workstation-adjusted image onto transparency material. This digitally produced 'internegative' transparency can now be used to replicate multiple copies of the original image on low cost color print paper, using a conventional analog electro-optic system and an associated chemical-based print developing unit, thereby providing a substantial savings in reproduction time and costs.

During an optical imaging and contact printing process, a laminate, comprised of a pre-dyed filter (D-min) layer, the digitally produced internegative transparency, and a sheet of relatively low cost copy medium, such as contact print paper, is illuminated by an image transfer light source, so as to transfer the mirror-reversed, complement image onto the color print paper. This exposed photographic copy medium is then chemically developed to obtain a hard copy reproduction of the positive image. Because the output copy is produced on a relatively low cost color print medium, such as the above-referenced Ektacolor color print paper, multiple copies of an original digitized image can be made through repeated illumination of the internegative onto sheets of this color print paper.

In accordance with a second embodiment of the invention, where the output print medium constitutes a negative image print medium, such as reverse color contact print paper, the hybrid system performs a mirror-image reversal of the stored digital positive color image and again digitally adjusts prescribed characteristics (e.g. tone and color) for reproduction of the positive image onto a negative reproduction media that may be used by a conventional chemical development process (e.g. Ektacolor print paper). As in the first embodiment, the mirror-reversed color image is output to a high spatial resolution digital output device, that prints a mirror-reversed image onto transparency material. The transparency image is then transferred to a reverse color print paper, which is then chemically developed to obtain a hard copy reproduction of the image. Again, because the output copy is produced on a relatively low cost color print medium, multiple copies of an original digitized image can be made through repeated illumination of the internegative onto this material.

Pursuant to a third embodiment of the invention, where the characteristics of the print device make it possible to modify its operational parameters, for example to replace a cyan, yellow magenta color print control ribbon with a red, green, blue ribbon, the amount of preliminary processing of the digitized image can be reduced by directly coupling the image data to the printer for generation of the internegative transparency without substantial, if any, intermediate processing.

In accordance with a fourth embodiment of the invention, where the output print device employs a sequential print process to print the respective color components of the internegative transparency, processing of the digitized original image can be substantially reduced by segregating the digital processing of the three color components of the stored image into sequential time frames respectively associated individual ones of the color components. For example, in the case of a digital thermal printer which uses a rotating drum around which a multicolor ribbon having three spatially sequential color regions is wound, for sequentially printing the three colors in order, processing time can be reduced by processing one color, while another color is being printed. In effect, digital processing of one color data set is performed concurrently with the printing of another color data set, thereby reducing processing time.

DETAILED DESCRIPTION

Figure 1:
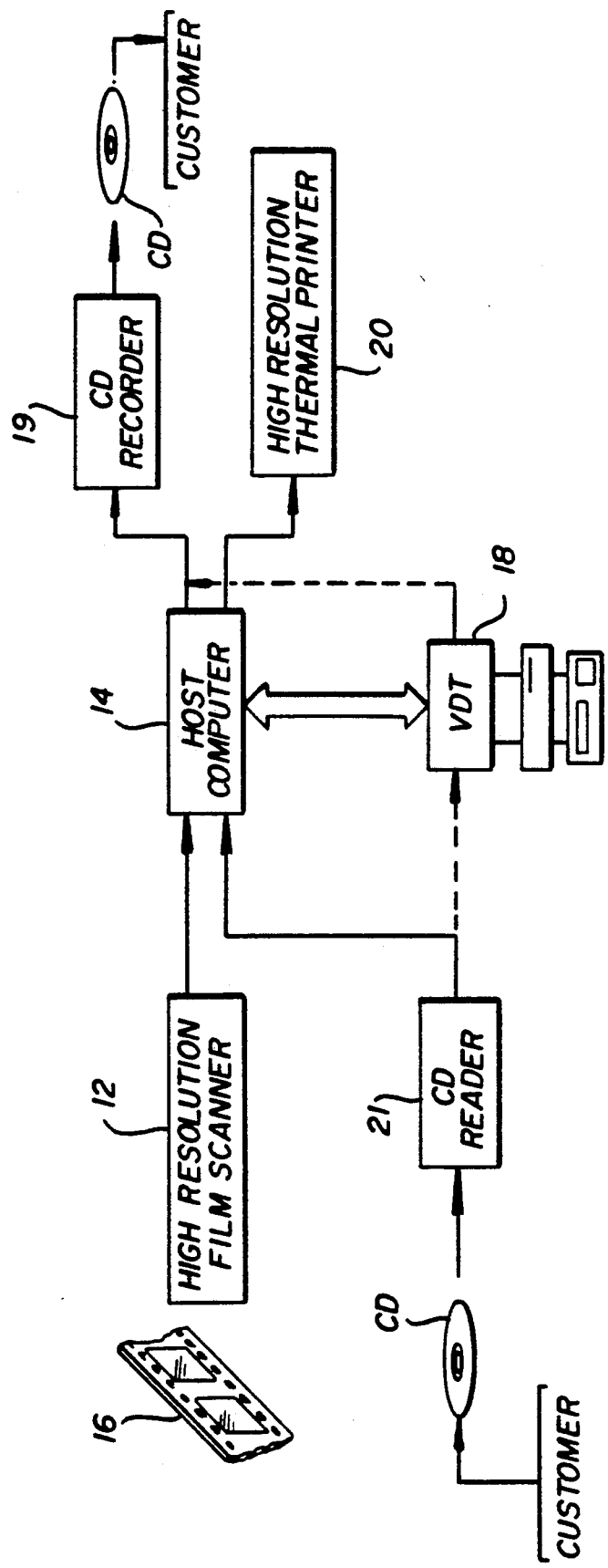
FIG. 1 diagrammatically illustrates a digital photofinishing apparatus described in the above-referenced copending application Ser. No. 582,305 filed Sep. 14, 1990 entitled "Multiresolution Digital Imagery Photofinishing System.
Figure 2:
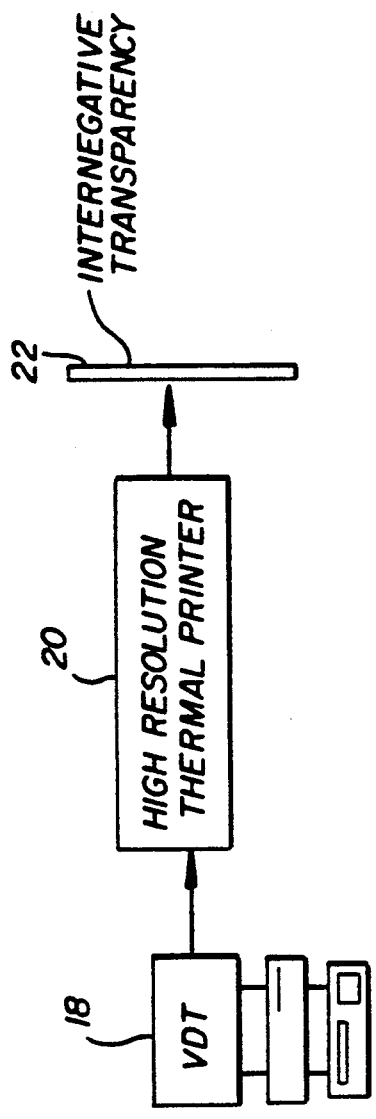
" and FIGS. 2 and 3 are a diagrammatic illustration of a hybrid image photo-finishing system in accordance with an embodiment of the present invention.

Referring now to FIG. 2, a diagrammatic illustration of a hybrid image photo-finishing system in accordance with a first embodiment of the present invention is shown as comprising a digital image-processing video display terminal or workstation 18. Using this workstation, the user (photo-finisher) is able to digitally adjust prescribed characteristics (e.g. tone and color) of the digitized image, using one or more customarily employed image processing software modules, resident within workstation 18, such as the algorithms described previously, which may be implemented in the form of color metric transform matrices and look-up tables, so as to optimize the data representation of the stored digital image for the intended reproduction device. The horizontal orientation of the adjusted positive image is then mirror-reversed in order to effect proper face to face alignment of the dye side and the emulsion side of the copy medium to be processed, and is subjected to an inverting or complementing operation, so as to convert the image into a mirror-reversed inverted or 'negative' output image.

Workstation 18 is coupled to a high spatial resolution, digitally driven reproduction device 24, such as a color photostatic printer or digital thermal printer. For purposes of an illustrative example, output device 20 may comprise a commercially available, Model Kodak XL-7700 high resolution digital thermal color printer, manufactured by the assignee of the present application. As explained previously, thermal color printer 20 normally receives positive image-representative data and prints this digitally processed positive image directly upon a sheet of relatively costly thermal color photoprint paper.

Now, although digital thermal color printer 20 is able to provide a high quality hard copy of an optimized positive color image directly from the digital data base, it is relatively slow, so that each color print produced requires the same processing time and entails the same cost per print. As a consequence, in a high volume, multiple print application, the cost per print remains relatively high, so that there is no savings in cost or reproduction time regardless of the number of prints made. In a conventional contact print photo-finishing process, on the other hand, multiple copies of an original negative may be produced through a repeated illumination of the negative onto successive sheets of photosensitive color print paper and chemically developing the exposed sheets.

A first embodiment of the hybrid system according to the present invention takes advantage of the reduced reproduction time and cost per print of such a conventional optical/chemical reproduction scheme by converting an adjusted positive image, that would otherwise be output to the thermal printer and printed on hard copy thermal paper, into a second mirror-reversed digital color image which effectively corresponds to a mirror-reversal, complement of the positive image. When this mirror-reversed complement image is output to the thermal printer, it is printed onto a transparency medium 22, such as XL-Transparency material, rather than directly onto thermal print paper. With the mirror-reversed complement image captured on transparency medium 22, the photo-finisher possesses an 'internegative' that can be used to expeditiously replicate relatively low cost copies of the original image.

Figure 3:
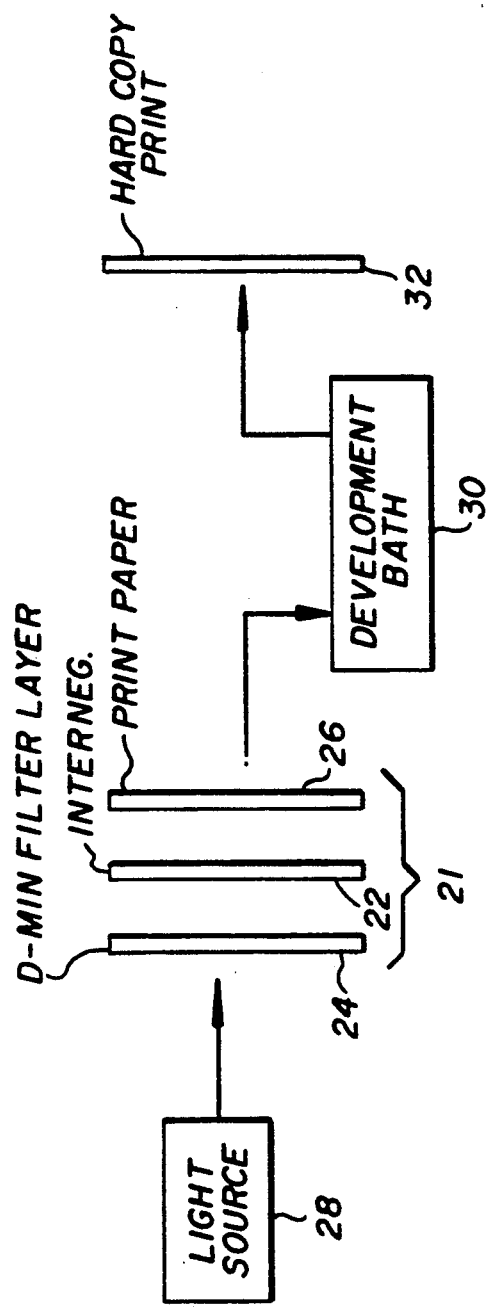

The output print process is diagrammatically illustrated in FIG. 3, which shows a laminate 21 of a pre-dyed (D-min) filter layer 24, internegative transparency 22 and a sheet of positive contact print paper 26, such as Ektacolor (Trademark Eastman Kodak Co.) print paper, being illuminated by a light source 28, so as to form the mirror-reversed complement image onto the copy paper 26. The exposed photographic copy paper 26 is then chemically developed in a conventional wet development bath 30, to produce a hard copy reproduction 32 of the positive digital color image, originally processed in workstation 18.

Instead of using a separate pre-dyed filter layer 24, transparency 22 itself may be tinted to incorporate the (orange cast) filtering effect of the D-min filter layer 24. Alternatively, if code resolution permits, the stored complement image data may be modified or offset in workstation 18 to incorporate the effect of the D-min parameter directly into the image database.

The performance of the present invention to typical photo-finishing applications has demonstrated a significant benefit in both cost and time of reproduction. For example, in a typical application of a reproduction run of 3.5"×7" greeting cards, the cost benefit is substantially immediate for any number beyond a single print. From a reproduction time standpoint, a savings is observed as the number of copies exceeds ten prints. For larger volume print runs, the reduction in cost and time become quite substantial. Namely, since the time and cost of the thermal print process is essentially proportional to the quantity of prints made, then, as the number of prints per image increases, the availability of the digitally-based internegative used in the inventive process makes it possible to rapidly replicate multiple copies on considerably less expensive color print paper using an analog contact printing and development process.

In the foregoing description of the present invention, the output medium (contact print paper 26) upon which the image captured on internegative transparency 22 is projected is a positive print medium. However, the present invention is equally applicable to the use of a reverse color print paper as the output medium. For this purpose, in accordance with a second embodiment of the invention, the hybrid system again performs a mirror-image reversal of the stored digital positive color image and again digitally adjusts prescribed characteristics (e.g. tone and color). As in the first embodiment, the mirror-reversed color image is output to a high spatial resolution digital output device (thermal printer 20 shown in FIG. 2) which prints a mirror-reversed positive image onto transparency material 22. Then, using the image transfer, reproduction process diagrammatically illustrated in FIG. 3, the transparency image is transferred to a reverse color print paper 26, which is chemically developed, via development bath 30, to obtain a hard copy reproduction 32 of the image. As in the first embodiment, because the output copy is produced on a relatively low cost color print medium, multiple copies of an original digitized image can be made through repeated illumination of the internegative onto sheets of relatively inexpensive photo-sensitive color print paper.

As pointed out above, one example of an output print device that may be used to generate the internegative transparency is a high resolution digital thermal printer. In operation, such a printer typically employs a color print control mechanism in the form of a multicolor (e.g. CYM) ribbon containing three successively adjacent color regions respectively associated with different ones of a specified color set through which the color transparency is generated. Pursuant to a further, third embodiment of the invention, where the characteristics of the print device make it possible to modify its operational parameters, for example to replace a cyan, yellow magenta color print control ribbon with a red, green, blue ribbon and allows reverse printing on the transparency medium, then the amount of preliminary processing of the digitized image can be reduced. Indeed, if the output characteristics of the printer can be tailored to print either positive or negative color images and sufficiently match the color metric of the digitized image, then the digitized image may be coupled directly to the printer for generation of the internegative transparency without substantial, if any, intermediate processing.

Alternatively, in accordance with a fourth embodiment of the invention, where the output print device (e.g. digital color thermal printer) employs a sequential print process to print the respective color components of the internegative transparency, then (metric conversion or mirror reverse) processing of the digitized original image can be substantially reduced by segregating the digital processing of the three color components of the stored image into sequential time frames respectively associated individual ones of the color components. For example, in the case of a digital thermal printer which uses a rotating drum around which a multicolor (e.g. CYM) ribbon having three spatially sequential color regions is wound, for sequentially printing the three colors in order, processing time can be reduced by processing one color, while another color is being printed. In the example of a CYM color set, the cyan is processed first. As the cyan representative data is being forwarded to the printer and used to control the transfer of cyan pixels from the cyan region of the print control ribbon to the transparency, the processor operates on the yellow component of the image data. Then, following the cyan print cycle, as the yellow data is being forwarded to the printer and used to control the transfer of yellow pixels from the yellow region of the print control ribbon to the transparency, the processor operates on the magenta component of the image data. Finally, the magenta data is printed. In other words digital processing of one color data set is performed concurrently with the printing of another color data set, thereby reducing processing time.

As will be appreciated from the foregoing description, the present invention provides a hybrid photo-finishing system which integrates the low cost and reduced processing time for multiple copy replication by an analog optic/chemical system with the digital enhancement flexibility of a digital image processing system, thereby making it possible to substantially reduce the time of production and cost of printing large quantities of hard copy prints of images that have been optimized in a digital processing scheme.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method of reproducing an image from a digital image data base representation of the image onto a light sensitive media, comprising the steps of:
   (a) processing the representative digital image data to derive an inverse digital image representation;
   (b) operating a digital printer in accordance with said inverse digital image representation to thereby cause said digital printer to print a negative image on a transparency medium;
   (c) illuminating said transparency medium so as to form a positive image onto a light sensitive media; and
   (d) processing said light sensitive media to obtain a reproduction of said image.

2. A method according to claim 1, wherein step (a) comprises processing said representative digital image data to derive an inverse digital image representation incorporating therein D-min parameter-representative data for the reproduction of said image.

3. A method according to claim 1, wherein step (c) comprises illuminating a laminate containing a dye-base layer, said transparency medium, and said light sensitive medium so as to transfer the image that was printed onto said transparency medium in step (b), onto said light sensitive medium.

4. A method according to claim 1, wherein step (c) comprises illuminating a laminate structure, containing said transparency medium the light transmissivity of which is defined in accordance with a D-min parameter for the reproduction of said image, and said light sensitive medium, so as to transfer the image that was printed onto said transparency medium in step (b), onto said light sensitive medium.

5. A method according to claim 1, wherein step (a) comprises processing said representative digital image data to derive an inverse digital image representation of a mirror-reversal of said image.

6. A method according to claim 1, wherein step (a) comprises processing said representative digital image data to derive an inverse digital image representation of a mirror-reversal, color complement of said image.

7. A method according to claim 1, wherein said light sensitive media comprises a positive color copy media.

8. A method of reproducing an image using a digital image data base in which first digital data representative of a color image may be output to a digital color output printer for printing a color image onto a color print medium, a method of reproducing a copy of said color image onto a photographic copy medium other than said color print medium, comprising the steps of:

(a) processing said first digital data to derive second digital data representative of said color image;

(b) driving said digital color printer in accordance with said second digital data and causing said digital color printer to print a color internegative image onto a color transparency medium;

(c) illuminating a laminate containing said color internegative transparency medium and said photographic copy medium so as to transfer the color image, that was printed onto said internegative transparency medium in step (b), onto said photographic copy medium; and (d) developing said photographic copy medium to obtain a reproduction of said color image.

9. A method according to claim 8, wherein step (a) comprises processing said first digital data to derive second digital data representative of a mirror-reversal of said image.

10. A method according to claim 8, wherein step (a) comprises processing said first digital data to derive second digital data representative of a mirror-reversal, color complement of said image.

11. A method according to claim 8, wherein step (a) comprises processing said first digital data to derive second digital data representative of a mirror-reversed, color complement of said color image in which tone and color characteristics are defined to specify the reproduction of the color image developed in step (d).

12. A process according to claim 8, wherein step (a) comprises processing said first digital data to derive second digital data representative of a complement of said image and incorporating therein D-min parameter representative data for the development of said image in step (d).

13. A method according to claim 8, wherein step (c) comprises illuminating a laminate structure, containing said color internegative transparency medium, a light transmissivity of which is defined in accordance with a D-min parameter for the reproduction of said image, and said photographic copy medium, so as to transfer the color image, that was printed onto said color internegative transparency medium in step (b), onto said photographic copy medium.

14. A method according to claim 8, wherein step (c) comprises illuminating a laminate containing a dye-base layer, said color internegative transparency medium, and said photographic copy medium so as to transfer the color image that was printed onto said color internegative transparency in step (b), onto said photographic copy medium.

15. An apparatus for producing a color print of a digitized color image stored as first digital data in a database comprising:

a digital image processor which processes said first digital data to derive second digital data representative of an inverse of said digitized color image;

a color printer coupled to said digital image processor which prints a mirror-reversal of said digitized color image onto a color transparency in accordance with the contents of said second digital data, thereby producing an internegative color transparency;

a light source which illuminates the internegative color transparency and an associated image reproduction medium and thereby causes said digitized color image to be transferred onto said image reproduction medium; and an image reproduction development unit which processes the image reproduction medium containing said digitized color image and thereby produces said color print.

16. An apparatus according to claim 15, wherein said digital image processor processes said first digital data to derive second digital data representative of a color inverse of said digital color image in which tone and color characteristics are defined to specify the reproduction of the color print.

17. An apparatus according to claim 15, wherein said reproduction development unit includes a light source which illuminates a laminate containing a dye-base layer, said internegative transparency, and a photographic copy medium so as to transfer the color image, that was printed onto said internegative transparency medium, onto said photographic copy medium.

18. An apparatus according to claim 15, wherein said digital image processor processes said first digital data to derive second digital data representative of an inverse of said image incorporating therein D-min parameter-representative data for the reproduction of said image.

19. An apparatus according to claim 15, wherein said reproduction development unit includes a light source which illuminates a laminate containing said internegative transparency, a light transmissivity of which is defined in accordance with a D-min parameter for the reproduction of said image, and said photographic copy medium, so as to transfer the negative color image, that was printed onto said color internegative transparency onto said photographic copy medium.

20. An apparatus according to claim 15, wherein said photographic copy medium comprises a positive color copy medium.

21. An apparatus according to claim 15, wherein said photographic copy medium comprises a reverse color copy medium.

22. An apparatus for producing a color print of a digitized color image stored as digital data in a digital database comprising:

a color printer coupled to receive from said digital database digital data representative of an inverse of said digitized color image and operative to print an inverse color image onto a color transparency, thereby producing an internegative color transparency;

a light source which illuminates the internegative color transparency and an associated image reproduction medium and thereby causes said color image to be transferred onto said image reproduction medium; and an image reproduction development unit which processes the image reproduction medium containing said color image and thereby produces said color print.

23. An apparatus according to claim 22, further including a digital image processor coupled to said digital database and said printer, said digital image processor being operative to process said digital data to derive further digital data representative of said digital color image in which its tone and color characteristics are defined to specify the reproduction of said color print.

24. A method according to claim 23, wherein said printer employs a sequential print process to print respective color components of said image onto said transparency, and wherein said digital image processor is operative to process a respective one of the color components of said digitized image data concurrently with causing said printer to print a respective other of the color components of said digitized image data.

25. An apparatus according to claim 22, wherein said photographic copy medium comprises a positive color copy medium.

26. An apparatus according to claim 22, wherein said photographic copy medium comprises a reverse color copy medium.

* * * * *